UNITED STATES PATENT OFFICE.

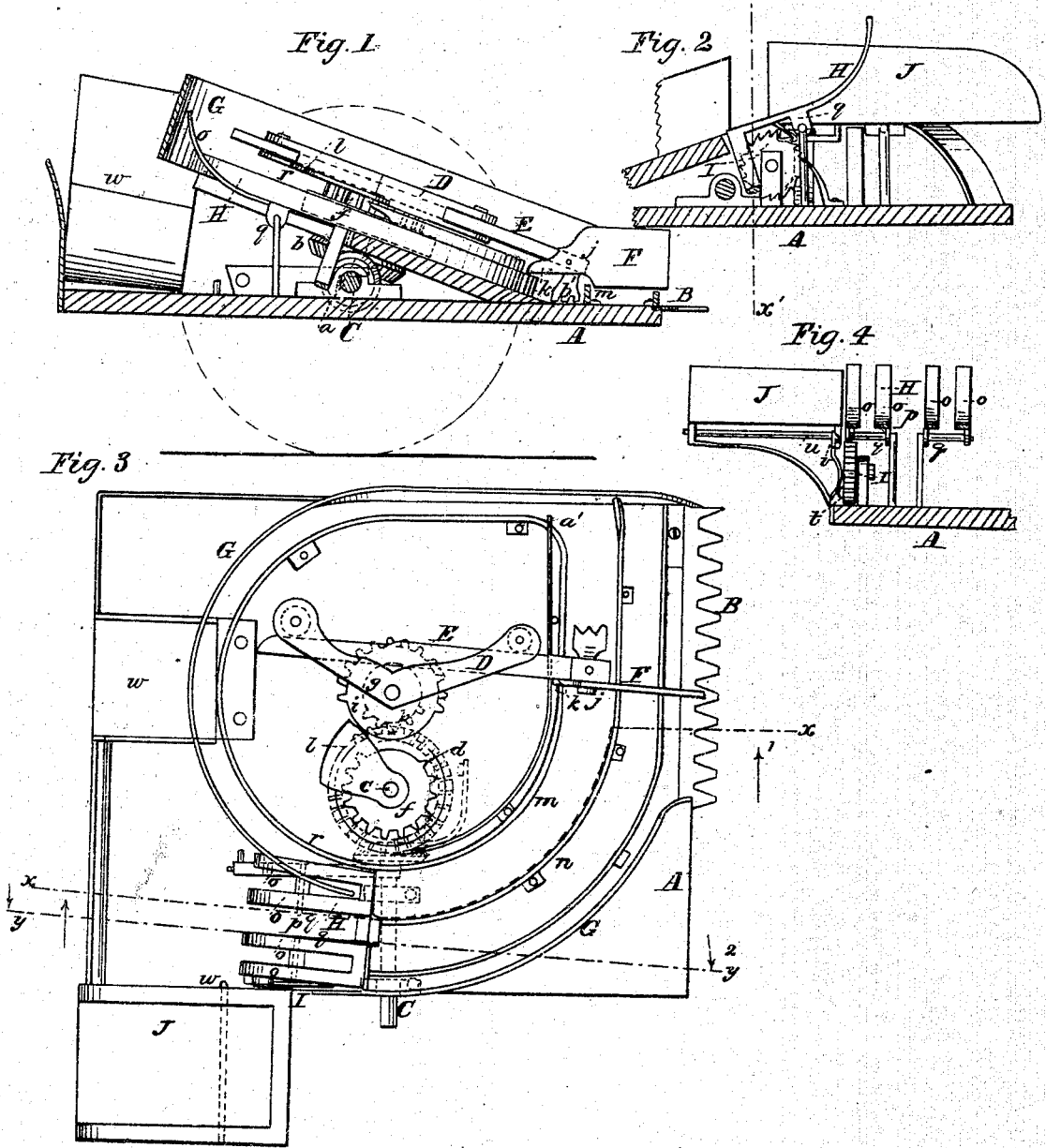

D. SANFORD, OF TAYLOR, ILLINOIS.

IMPROVEMENT IN HARVESTERS.

Specification forming part of Letters Patent No. 26,376, dated December 6, 1859.

*To all whom it may concern:*

Be it known that I, D. SANFORD, of Taylor, in the county of Ogle and State of Illinois, have invented a new and Improved Raking Attachment for Harvesters; and I do hereby declare that the following is a full, clear, and exact description of the same, reference being had to the annexed drawings, making a part of this specification, in which—

Figure 1 is a longitudinal vertical section of my invention, taken in the line $x\ x$, Fig. 3, and looking in the direction indicated by the arrows 1; Fig. 2, a longitudinal vertical section of the same, taken in the line $y\ y$, and looking in the direction indicated by the arrows 2; Fig. 3, a plan or top view of the same; Fig. 4, a vertical transverse section of a portion of the same, taken in the line $x'\ x'$, Fig. 2.

Similar letters of reference indicate corresponding parts in the several figures.

This invention consists in a novel arrangement of a rake and grain or gavel passage, and also in a tilting gavel-receiver and a box, as hereinafter fully shown and described, whereby the grain as it is cut is raked into gavels and into the receiver, in which they are bound by the attendant and thrown by him into a box, which is tilted intermittingly, so as to cast the sheaves in bundles on the ground.

To enable those skilled in the art to fully understand and construct my invention, I will proceed to describe it.

A represents the platform of a harvester, properly mounted on wheels.

B is the sickle, attached to the front end of the platform A. This sickle is of the usual reciprocating kind, and may be driven in any proper way.

To the axle C of one of the wheels, and at its inner end, a bevel-pinion, $a$, is attached, said pinion gearing into a bevel-wheel, $b$, which is on a shaft, $c$, that passes through the platform A. On the upper end of the shaft $c$ a wheel, $d$, is placed or secured, said wheel having a portion of its periphery toothed, and to the upper surface of the wheel $d$, and concentric with it, a wheel, $f$, is secured, also having a portion of its periphery toothed, the wheel $f$ being smaller than the wheel $d$, as shown clearly in Fig. 3.

Through the platform A a shaft, $g$, passes. This shaft $g$ has a wheel, $h$, on its upper end above the platform A, said wheel being toothed on a portion of its periphery. To the upper side of the wheel $h$ a wheel, $i$, is attached, said wheel being also toothed on a portion of its periphery. The smooth portions of the wheels $d\ h$ and $f\ i$ work opposite each other, and consequently the toothed portions gear into each other as they come in contact.

To the upper end of the shaft $g$ a bent arm, D, is attached, the outer ends of said arm forming a guide for a rake-bar, E, which is allowed to slide freely therein. To the outer end of the bar E the rake F is attached by a joint or pivot, $j$, the inner end of the rake having a projecting spur, $k$, attached, as shown clearly in Fig. 1.

To the upper surface of the wheel $f$ a curved plate, $l$, is attached, the use of which will be presently explained, and on the platform A a curved guide-strip, $m$, is attached, against which the inner edge of the rake F bears, as shown clearly in Fig. 1. On the platform A there is also placed a curved guard or fence, G G, a space, $n$, being allowed at the right side of the platform, said space forming a grain or gavel passage, and having a receiver, H, at its back end. The receiver H is formed of slats or bars $o$, which are curved, so as form a proper receptacle, with an opening, $p$, at its center to allow bands to be placed around the gavels. This receiver is placed loosely on shafts $q$, and has a projection, $r$, at its inner side.

To the under side of the receiver H, at its right hand side, a pawl, $s$, is attached, said pawl working into a ratchet, I, below the receiver, which ratchet has a projection, $t$, on its outer side.

To the right side of the platform A a box, J, is attached, said box being placed loosely on a shaft, $u$, so as to be capable of being tilted. This box J is heaviest at its back, and so as to have a tendency to drop and deposit its contents at the back of the machine. The box, however, is held in proper position by a spring-catch, $v$, (see Fig. 4,) when said box is not acted upon by an extraneous force. On the platform A, to the left of the receiver H, a box or receptacle, $w$, is placed.

The operation is as follows: As the machine is drawn along the shafts $c\ g$ are rotated by the gearing $a\ b$ in connection with the wheels $d\ h\ f\ i$, the latter gearing alternately into each other. The arm D and rake-bar E are rotated of course with the shaft $g$, and the rake F traverses around on the platform A, the rake sweeping over the front part of the platform parallel with the sickle B, in consequence of the sliding movement allowed the bar E and the guide-strip m, the latter causing the horizontal movement of the rake. The rake F, in passing over the front part of the platform A and up the passage or space n, sweeps a gavel into the receiver H, the rake as it passes the receiver being thrown upward by the plate l, so as to pass in an elevated position around at the back of the platform, the rake being thrown down as it approaches the sickle by a projection, a'. As the receiver H is filled at each revolution of the rake F, the attendant, who stands back of the receiver H binds the gavel in the receiver, and the receiver is tilted by a projection, b', on the bar E, and the attendant throws the bound sheaf on the box J. Each time the receiver H is tilted the pawl s moves the ratchet I one notch, and at every revolution of the ratchet I the projection t disengages the catch v, and the box J tilts by its own gravity and its contents fall on the ground, the number of sheaves that are deposited on the ground corresponding to the number of teeth on the ratchet I. The box w serves to hold bands that may be readily grasped by the operator, and a retaining-pawl, c', prevents the ratchet I from turning casually in the wrong direction.

Any proper means may be devised for throwing the wheels a b in and out of gear.

In consequence of having the rake-bar operated intermittingly by the different-sized gearing d h f i, as shown, the rake is made to move with an accelerated speed directly back of the sickle, so as not to interrupt the cutting operation of the sickle, or, rather, the falling of the cut grain on the platform, the speed being retarded during the remaining portion of the movement of the rake to afford sufficient time for a requisite quantity of grain to fall on the platform.

I am aware that sliding rake-bars have been used in various ways, and I do not claim broadly such device. Nor do I claim broadly a tilting receiver, H; but,

Having thus described my invention, what I claim as new, and desire to secure by Letters Patent, is—

1. The sliding rake-bar E, fitted within the bent arm D, and provided with a jointed rake-head, F, in connection with the guide-strip m and a gavel-passage, n, on the platform A, substantially as described.

2. The combination of the tilting gavel-receiver H with the tilting box J, when arranged to operate together automatically, as and for the purpose set forth.

D. SANFORD.

Witnesses:
WILLIAM MOREY,
JOHN WESTOVER.